Sept. 25, 1962     J. L. COLLINS     3,055,998
TIRE DEFLATION INDICATOR
Filed May 10, 1960     2 Sheets-Sheet 1
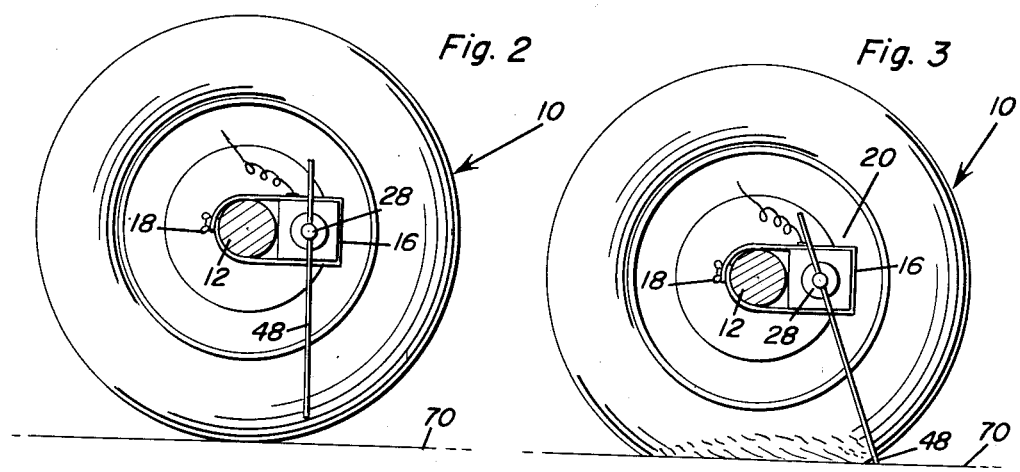
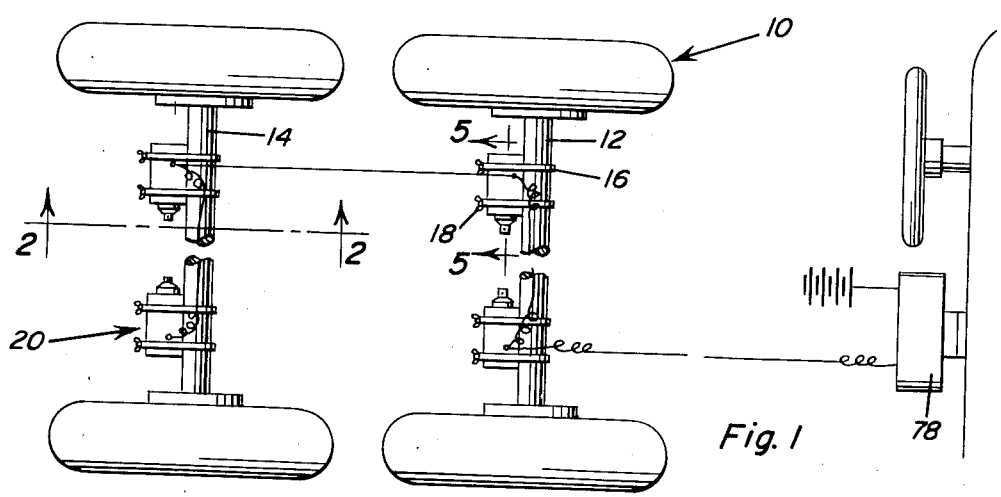
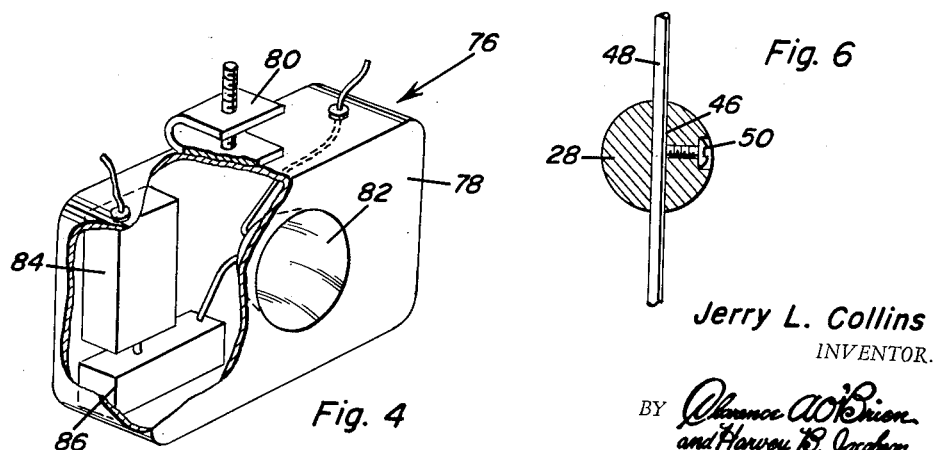
Jerry L. Collins
INVENTOR.

Sept. 25, 1962
J. L. COLLINS
3,055,998
TIRE DEFLATION INDICATOR
Filed May 10, 1960
2 Sheets-Sheet 2
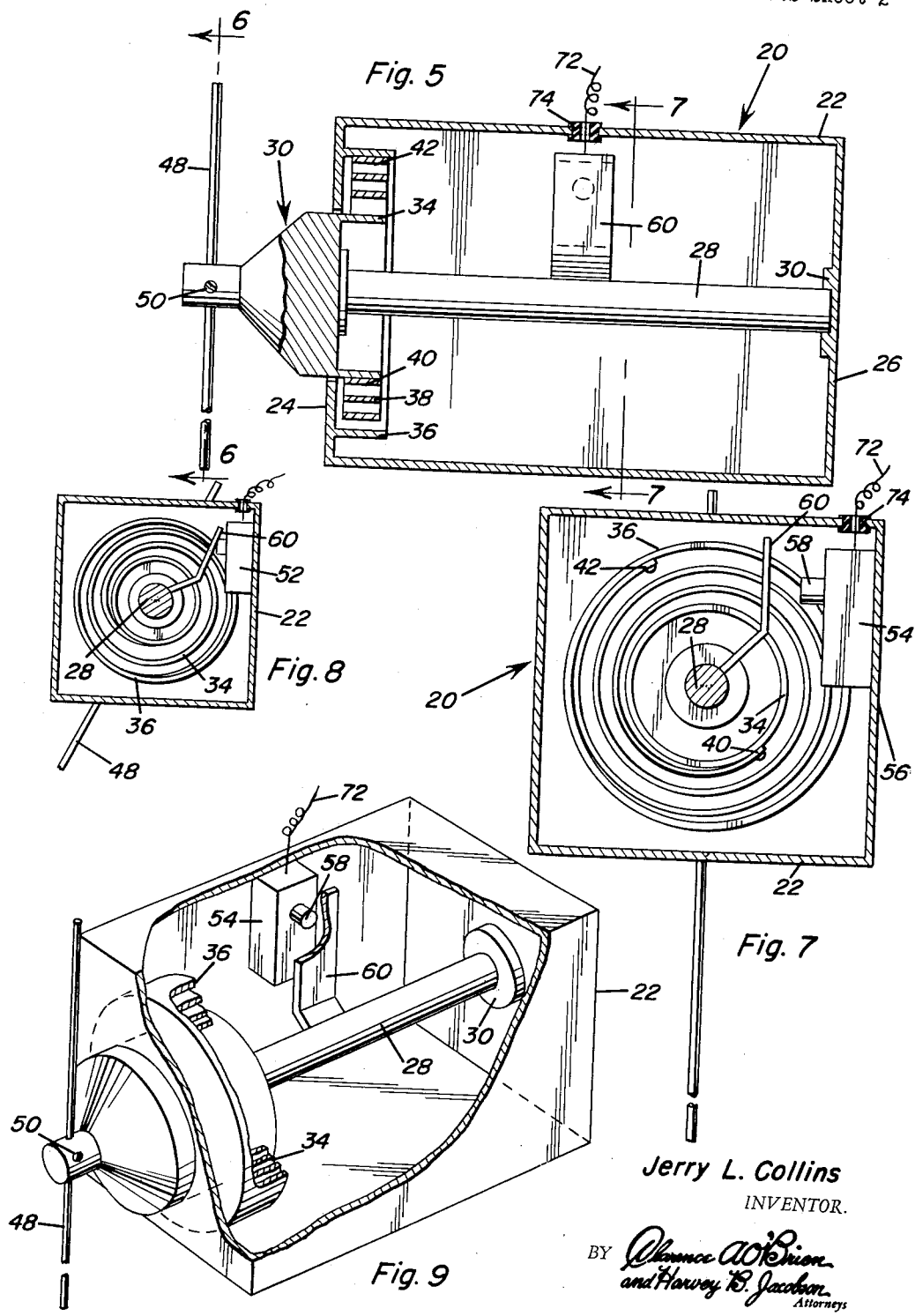
Jerry L. Collins
INVENTOR.

3,055,998
TIRE DEFLATION INDICATOR
Jerry L. Collins, Santa Maria, Calif.
(P.O. Box 39, Indian Springs, Nev.)
Filed May 10, 1960, Ser. No. 28,042
3 Claims. (Cl. 200—61.23)

This invention relates generally to signal means and more particularly to signal means adapted to be attached to a motor vehicle for indicating a low pressure condition of ground engaging pneumatic tires.

In recent years the use of tubeless tires has become more and more prevalent. Although tubeless tires are superior to former tube-type tires in many respects, it has been found that they often develop slow leaks. The slow leaks result from many reasons but perhaps the most frequent is when the wheel rim becomes somewhat deformed, the seal between the tire and the rim becomes less than perfect and air leaks from the tire therethrough. Inasmuch as it is extremely important to maintain the proper air pressure in tires at all times, it would be advisable to provide means for indicating to the vehicle operator when a low pressure condition of the tires exists. It is advisable to maintain proper air pressure in the tires for the purpose of assuring proper vehicle riding qualities, for preventing rapid tire wear and for eliminating the safety hazard presented by improper inflation.

In view of the above, it is the principal object of this invention to provide a novel indicator device adapted to be mounted on a motor vehicle for immediately indicating to the vehicle operator when a low pressure condition of the tires exists.

It is a more particular object of this invention to provide a novel indicator device adapted to indicate low tire pressure which is relatively simple in construction and accordingly inexpensive to manufacture. The indicator device is easily mountable on any conventional vehicle for indicating low tire pressure. The device includes relatively few moving parts and accordingly is maintenance free, reliable, and durable.

It is a still more particular object of this invention to provide a novel indicator device adapted to be mounted on a vehicle for indicating low pressure tire conditions. The device includes a switch which is actuatable when a feeler rod engages the ground when the tire of the vehicle proximate to which the feeler rod is located has low pressure. The switch may easily be connected to the vehicle electrical circuit for energizing an audible or visual signal to indicate to the operator that a particular tire requires air.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary plan view of a portion of a conventional vehicle and illustrates how a tire inflation indicator may be mounted adjacent the tires for indicating a low pressure condition thereof, the figure also showing how a plurality of indicator devices may be connected together and to the vehicle electrical circuit for visually or audibly signalling the particular tire needing air;

FIGURE 2 is an enlarged vertical sectional view taken substantially along the plane 2—2 of FIGURE 1 illustrating how the indicator device may be mounted on an axle housing proximate to a tire;

FIGURE 3 is a vertical sectional view similar to FIGURE 2 showing how the indicator device is actuated when a low pressure condition of the tire exists;

FIGURE 4 is a perspective view partially broken away of the signal assembly which may be mounted on the vehicle dashboard and which is adapted to be connected to an indicator device switch for signalling a low pressure tire condition;

FIGURE 5 is an enlarged vertical sectional view taken through one of the indicator devices;

FIGURE 6 is an enlarged sectional view taken substantially along the plane 6—6 of FIGURE 5;

FIGURE 7 is a vertical sectional view taken substantially along the plane 7—7 of FIGURE 5;

FIGURE 8 is a sectional view similar to that of FIGURE 7 but illustrates the indicator device in an actuated position; and FIGURE 9 is a perspective view partially broken away of an indicator device.

With continuing reference to the drawings, attention is initially called to FIGURE 1 wherein a partial view of a conventional motor vehicle is shown. The numeral 10 generally represents the pneumatic tires which may be of tubeless or tube type. Each of the tires 10 is mounted so as to enable it to rotate relative to the axle housings 12 and 14. Secured to the axle housing as by bands 16 fastened at 18, are indicator devices generally designated at 20. It is to be noted that an indicator device 20 may be mounted on the axle housing proximate to each of the pneumatic tires 10.

Each indicator device 20 includes a housing 22 including end walls 24 and 26. A shaft 28 is rotatably journalled in the housing 22. The shaft 28 is rotatably received in boss 30 of end wall 26 and extends through an opening in the end wall 24. Secured to the shaft 28 is a cup-like hub 30. A rim 34 is concentrically formed about the hub 30 and spaced therefrom. An inwardly projecting flange 36 is fixed to the end wall 24 of housing 22. A spiral spring 38 is fixed between the rim 34 at 40 and to the flange 36 at 42. It will be appreciated that the spring 38 biases the shaft 28 in a particular rotational position. More particularly, the spring 38 tends to prevent rotational movement of the shaft 28 and also tends to return the shaft 28 to its normal position if the shaft is turned.

A transverse opening 46 diametrically extends through the shaft 28 at one end thereof. A feeler rod 48 is slidably received in the opening 46 and a radially extending setscrew 50 is threadedly received in the shaft 28 and engageable with the feeler rod 48 so as to allow the rod 48 to be selectively locked in position with respect to the shaft 28.

A normally open switch 54 of conventional construction is mounted on the wall 56 of housing 22. The switch 54 is provided with a push-button switch actuator 58 in alignment with a projection or arm 60 which is secured to the shaft 28 and extends laterally therefrom.

In use, the indicator device 20 is secured to an axle housing by straps 16 as particularly indicated in FIGURES 1 through 3. Under normal conditions, the rod 48 extends vertically as the bias spring 38 retains the shaft 28 in the predetermined desired position. When a tire is properly inflated, the rod 48 will be out of engagement with the ground 70 as indicated in FIGURE 2. However, when air leaks from the tire 10, the axle housing 12 or 14 will approach the ground and carry with it the indicator device 20. The rod 48 will engage the ground surface 70 as indicated in FIGURE 3 and accordingly cause the shaft 28 to rotate against the resiliency of spring 34. The rotation of shaft 28 carries the radial projection 60 into engagement with the switch actuator 58 to close the switch 54.

A conductor 72 extends from the housing 22 through grommet 74 and is connected to the vehicle electrical system in series with a signal unit 76. The signal unit 76 includes a casing 78 having mounted thereon a clamp 80 adapted to secure the casing 78 to the instrument panel of the vehicle. Mounted within the casing 78 is a visual signal device 82 and an audible signal device 84. A flasher 86 may be electrically connected thereto. As any one of the tires 10 becomes deflated, the rod 48 on the indicator device 20 mounted proximate thereto will engage the ground and cause the switch 54 to close which cause current from the electrical system of the vehicle to be applied to the signal devices 82 and 84. The energization of the signal devices 82 and 84 will inform the operator that one of the tires 10 is low. Although FIGURE 1 illustrates the switches of the units 20 connected in parallel so that the closure of any one of the switches 54 will energize the signal devices 82 and 84, an electrical circuit, well known by those skilled in the art, may be used so as to provide a separate signal device connected to each of the switches in the indicator units 20 so as to enable the operator to be informed as to the particular tire 10 which is deflated.

Although mention has been made of conventional motor vehicles, the indicator device disclosed finds particular utility when used with trailers as house trailers. The particular materials utilized for the various elements of the invention are not critical as long as their particularly necessary and apparent qualities are met. It should be appreciated that inasmuch as all the switches 54 are preferably grounded to the vehicle at one terminal, only one conductor need be extended therefrom for properly energizing the signal devices.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An actuator for a tire deflation indicator, said actuator comprising in combination a housing adapted to be secured in a fixed position to a vehicle, said housing including a pair of spaced end walls and a side wall, a shaft rotatably journalled in the end walls of said housing and projecting at one end outwardly from the latter, a ground engaging rod secured to the projecting end of said shaft, an arm secured to said shaft within the housing and extending laterally therefrom, a normally open electric switch mounted on said side wall in the housing and having a depressible actuator disposed in the path of movement of said arm and depressibly engaged by said arm when said shaft is rotated in one direction by engagement of said rod with the ground whereby to effect closing of said switch, resilient means provided in said housing and connected to said shaft for urging the latter to a position wherein said arm is disengaged from the actuator of said switch, a hub provided on the end portion of said shaft projecting outwardly from said housing, the end wall of the housing adjacent the projecting shaft portion being provided with a circular opening having said hub rotatably disposed therein, said resilient means comprising a spiral spring, and an inwardly projecting annular flange provided on said last mentioned end wall of said housing concentrically with said shaft, said spirial spring being disposed within said annular flange in surrounding relation with said hub, one end of the spring being anchored to said flange and its other end being anchored to said hub.

2. An actuator for a tire deflation indicator, said actuator comprising in combination a housing adapted to be secured in a fixed position to a vehicle, said housing including a pair of spaced end walls and a side wall, a shaft rotatably journalled in said housing on one of said end walls and projecting outwardly from the housing through a circular opening formed in the other end wall, a hub provided on the projecting end portion of said shaft and rotatably disposed in said opening, a ground engaging rod secured to the projecting end of said shaft and extending radially outwardly from the latter, means for adjusting the radial extent of said rod relative to the shaft, an arm secured to said shaft within said housing and extending laterally therefrom, a normally open electric switch mounted on said housing side wall and having a depressible actuator disposed in the path of movement of said arm and depressibly engaged by said arm when said shaft is rotated in one direction by engagement of said rod with the ground whereby to effect closing of said switch, an annular flange projecting inwardly from the housing end wall formed with said opening, said flange being concentric with said shaft, and a spiral spring disposed within said annular flange in surrounding relation to said hub, said spring having an outer end anchored to said flange and an inner end anchored to said hub and urging said shaft to a position wherein said arm is disengaged from the actuator of said switch.

3. An actuator for a tire deflation indicator, said actuator comprising in combination a housing adapted to be secured in a fixed position to a vehicle, said housnig including a wall provided with a circular opening, an inwardly projecting annular flange provided on said wall concentrically with said opening and in radially spaced relation from said opening, a rotatable shaft disposed in said housing and projecting outwardly through said opening, a hub provided on said shaft and rotatably journalled in said opening, a ground engaging rod secured to the projecting end of said shaft and extending radially outwardly from the latter, an electric switch provided in said housing, means for closing said switch in response to rotation of said shaft by engagement of said rod with the ground, and a spiral spring disposed within said annular flange in surrounding relation to said hub, one end of said spring being anchored to said flange and its other end being anchored to said hub for resiliently biasing said shaft against rotation by engagement of said rod with the ground.

References Cited in the file of this patent

UNITED STATES PATENTS

| | | |
|---|---|---|
| 2,213,782 | Kite | Sept. 3, 1940 |
| 2,654,876 | Austin | Oct. 6, 1953 |
| 2,794,083 | Moretti | May 28, 1957 |

FOREIGN PATENTS

| | | |
|---|---|---|
| 36,239 | France | Apr. 30, 1930 |
| | (1st addition No. 673,313) | |
| 981,827 | France | May 31, 1951 |